United States Patent Office 3,462,060
Patented Aug. 19, 1969

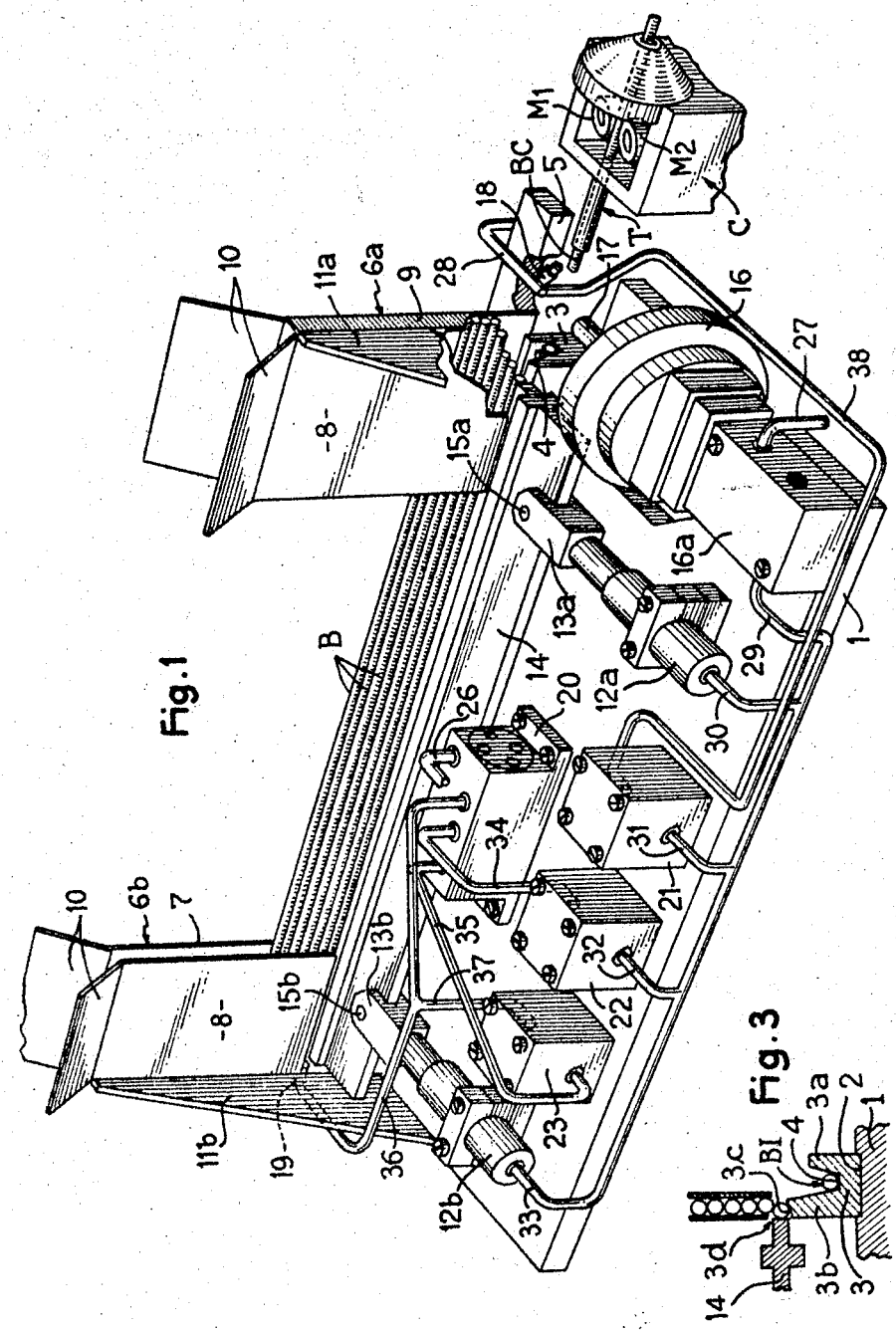

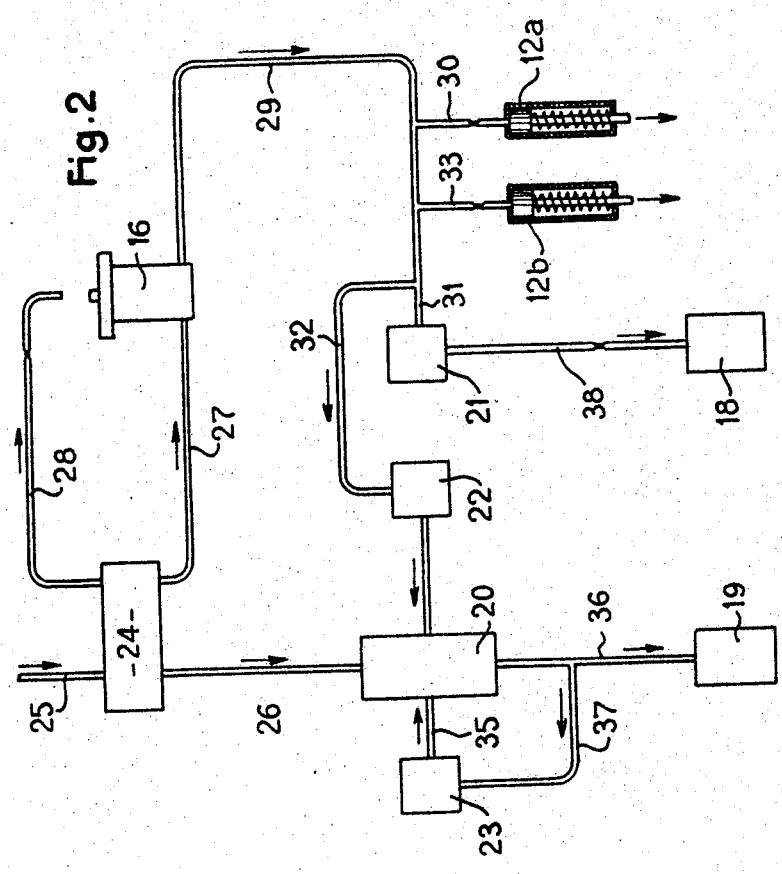

---

3,462,060
DEVICE FOR AUTOMATICALLY SUPPLYING WELDING RODS TO BLOWPIPES
Louis Minjolle, Evreux, France, assignor to Commissariat a l'Energie Atomique, Paris, France, a French body corporate
Filed Nov. 1, 1967, Ser. No. 679,791
Claims priority, application France, Nov. 24, 1966, 84,786
Int. Cl. B23k 1/00, 5/00
U.S. Cl. 228—41                                   9 Claims

---

ABSTRACT OF THE DISCLOSURE

A supply device for supplying welding rods to a blowpipe comprising a feed device in which the welding rods are disposed in parallel relationship, a presenting device for presenting the rods to the blowpipe, a transfer device for transferring each rod from the feed device to the presenting device, a thrust device for exerting a thrust on each rod dropping into the presenting device, detecting means detecting the issue of each rod from the presenting device and a time synchronizing device responsive to the detecting means for controlling successively the transfer device and thrust device.

---

The present invention concerns projection blowpipes provided with weldng rods and more particularly to a supply device for such blowpipes which automatically supplies welding rods to the blowpipes.

The object of the invention is to provide a supply device of the general type indicated hereinbefore which comprises in combination a feed device in which are disposed the welding rods to be consumed in parallel one after the other, a device for presenting the rods in alignment with the blowpipe located below the feed device, a transfer device for transferring the rods one by one from the feed device to the presenting device, a thrust device for exerting an axial thrust on each rod which drops into the presenting device, said thrust device being located on the upstream side of the presenting device, detecting means responsive to the complete issue of each rod from the presenting device and located on the downstream side of the presenting device, and a time synchronizing device which is responsive to said detecting means so as to control successively said transfer device and said thrust device.

Further features and advantages of the invention will be apparent from the ensuing description with reference to the accompanying drawings.

In the drawings:

FIG. 1 is a perspective view, with a part cut away, of one embodiment of the invention;

FIG. 2 is a diagram showing the operation of the device shown in FIG. 1; and

FIG. 3 is a sectional view of a detail shown in FIG. 1.

According to the embodiment shown in the drawings, the automatic supply device according to the invention is designed to supply welding rods, or sticks, to a projection blowpipe C of conventional type shown diagrammatically (FIG. 1).

This blowpipe comprises two driving wheels $M_1$, $M_2$ which drive in a regular and continuous manner the rods B into the gun of the blowpipe in the usual manner. The driving wheels are driven by an electric motor (not shown) in the direction of arrows $f_1$. A tube T, fixed to the head of the blowpipe, serves to introduce the rods into the head between the two wheels $M_1$, $M_2$.

The supply device according to the invention comprises a rectangular support 1 in which is provided a recess 2 which is parallel and near to one of the large sides of the support. Disposed in said recess 2 is a strip 3 in which is provided a groove 4. The strip 3 and the groove 4 present the rods in alignment with the blowpipe C and thus constitute a rod-presenting device. As can be seen better in FIG. 3, and with reference to the section of the strip 3, the latter comprises two sides $3^a$, $3^b$ having different heights, the side $3a$ being nearer the edge of the support 1 and being the smaller of the sides. Further, the opposite side $3^b$ has an upper face $3^c$ which is slightly inclined.

The support 1 has a notch 5 (FIG. 1) the inner face of which constitutes the output of the presenting device. A rod feed device is located vertically below the inclined face $3^c$ (see FIG. 3). This device comprises two parts $6^a$ and $6^b$. Each part $6^a$, $6^b$ comprises two lateral plates 7 and 8, an end plate 9 and two divergent end portions 10 which facilitate the placing of the rods in the feed device. The parts $6^a$, $6^b$ are integral with the support 1 owing to the provision of L-section elements $11^a$, $11^b$ respectively so that a longitudinal slot $3^d$ is provided between the inclined face $3^b$ and the lower edges of the lateral plates 7 and 8 of each part.

Two jacks $12^a$, $12^b$ fixed to the support 1 are provided with forks $13^a$, $13^b$, the arrangement of these jacks being such that they act in a direction perpendicular to the strip 3. The forks $13^a$ and $13^b$ are integral with a thrust bar whose section is roughly in the shape of a cross. The forks $13^a$, $13^b$ are fixed to this bar by pins $15^a$, $15^b$. The height of the jacks $13^a$, $13^b$ relative to the support 1 is so chosen that the plane containing their axes intersects the slot $3^d$ roughly midway of the height of the latter.

A pneumatic detector 16 is disposed near an edge of the support 1 located in the vicinity of the head of the blowpipe C and of the output of the presenting device. This end of the supply device will be termed hereinafter the downstream end whereas the opposite end of the device will be termed upstream end.

The pneumatic detector 16 is of conventional type comprising an input tube 17 whose axis is perpendicular to the axis of the groove 4. It controls a pneumatic valve $16^a$ which opens when air is blown into the input 17.

A water spray nozzle 18 is disposed in the vicinity of the head of the blowpipe C, its outlet being directed in the direction of this head. This nozzle receives a supply of water through a conduit (not shown in the drawing).

Disposed on the downstream side of the device is an air bellows or blower 19, the outlet of which is located in the extension of the groove 4. Also provided on the support 1 is a distribution box 20 and three time-delay devices 21, 22 and 23 which constitute a time synchronizing device. The time-delay devices are of conventional type and delay the transmission of the air pressure between their inlet and outlet during a predetermined interval of time adjustable at will.

According to the embodiment shown and described, the supply device operates by means of compressed air whose circuit will now be described.

This circuit is fed by a source (not shown) of air under pressure of for example 4 bars which is connected to a connection box 24 by means of a conduit 25 (see FIG. 2).

The connection box 24 (not shown in FIG. 1) feeds the distribution box or distributor 20 by way of a conduit 26 and the pneumatic detector 16 by way of a conduit 27. Further, a connection 28 supplies a continuous stream of air in front of the input 17 of the pneumatic detector 16 (FIG. 1). The valve $16^a$ of the pneumatic detector 16 is connected to the two jacks $12^a$, $12^b$ and to the time-delay device 21 and 22 by way of a conduit 29 and branch pipes 30, 31, 32 and 33 respectively. The distribution box 20 is connected to the time-delay device 22 by way of a conduit 34, to the time-delay device 23 by way of a conduit 35, and to the bellows 19 by way of a conduit 36. The time-delay device 23 is also connected to the conduit 36 and therefore to the box 20 by way of a conduit 37. A conduit 38 connects the water spraying nozzle 18 to the time-delay device 21.

The distribution box 20 comprises a valve controlled by air under pressure coming from the conduit 24. In the excited position of this valve, air is supplied between the conduit 26 and the conduits 36 and 37. The time-delay device 23 can return this valve to its initial position by application of a pressure through the conduit 35.

This device supplying welding rods to a projection blowpipe operates in the following manner:

Let it be assumed that at the start of the cycle of operation a rod has been practically consumed by the blowpipe C so that compressed air enters the pneumatic detector 16 in issuing from the conduit 28 and entering the conduit 17. The lower rod $B_1$ of the series or rods disposed in the feed device at this moment rests on the inclined face $3^c$ and bears against the end face of the bar 14 opposed to the forks 13 and $13^b$. As air is blowing on the membrane of the detector 16, the valve $16^a$ is opened and allows air under pressure to the jacks $12^a$, $12^b$ through conduits 27 and 29 in opposition to the action of springs inside these jacks (see in particular FIG. 2). The bar 14 then undergoes a movement of translation in a direction perpendicular to the groove 4 so that the rod BI drops into the latter.

Assuming that the moment at which the valve 16 is opened is time $t=0$, the time-delay devices 21, 22 at this moment receive air under pressure at their inlets. The device 21, which is adjusted to effect a time-delay $t_1-t_0$, brings about at instant $t_1$ the spraying of water through the nozzle 18 and this wets the rear end of the rod BC which is being consumed in the blowpipe C. The time-delay device 22, which is set to effect a time-delay $t_2-t_0$, feeds the distributor 20 at instant $t_2$ and consequently a stream of air flows through the conduit 36 and the bellows 19 feeds the rod BI, at this moment located in the groove 4, forwardly. The stream of air issuing from the bellows 19 exerts such thrust that the rod moves forwardly up to the rear of the rod BC. The rod BI thus adheres to the wet rear end face of the rod BC. It is then brought towards the wheels $M_1$ and $M_2$ until it is in turn driven by the latter and is subsequently consumed in the blowpipe.

While the rod is being moved forwardly under the action of the bellows 19, the stream of air which entered the conduit 17 of the detector 16 by way of the conduit 28 is interrupted, the valve $16^a$ closes so that the jacks $12^a$ and $12^b$ react under the effect of their inner springs and return the bar 14 to its initial position, and the pile of rods in the feed device moves under the effect of gravity downwardly a distance equal to the diameter of a rod. Further the time-delay devices 21 and 22 are reset to zero and the spraying of water stops.

At this instant, at time $t_3$, the time-delay device 23 supplies air to the conduit 35 and this returns the valve inside the distribution box 20 to its initial position. A new cycle of operaton can then start, this cycle being initiated when the rod BI is no longer interposed between the conduit 17 and the conduit 28.

The welding rod supply device according to the invention is completely independent of the blowpipe. Consequently, it can be adapted to any known blowpipe without modification of the elements thereof.

Although a specific embodiment of the invention has been described, many modifications and changes may be made therein without departing from the scope of the invention as defined in the appended claims.

In particular, certain functions of the device can be performed by means other than the pneumatic means described hereinbefore without departing from the scope of the invention.

Having now described my invention what I claim as new and desire to secure by Letters Patent is:

1. A supply device for automatically supplying welding rods to a projection blowpipe, said device comprising in combination a feed device in which are disposed the welding rods to be consumed in parallel one after the other, a presenting device for presenting the rods in alignment with the blowpipe located below the feed device, a transfer device for transferring the rods one by one from the feed device to the presenting device, a thrust device for exerting an axial thrust on each rod which drops into the presenting device, said thrust device being located on the upstream side of the presenting device relative to the direction of feed of the welding rods, detecting means responsive to the complete issue of each welding rod from the presenting device and located on the downstream side of the presenting device, and a time synchronizing device which is responsive to said detecting means so as to control successively said transfer device and said thrust device.

2. A supply device as claimed in claim 1, further comprising a water spray device located on the downstream side of said presenting device and associated with to be brought into operation by said detecting means when a rod issues from the presenting device so as to wet the rear end face thereof.

3. A supply device as claimed in claim 1, comprising a support and a first bar integral with said support and having a groove which is in alignment with the blowpipe, said first bar constituting said presenting device.

4. A supply device as claimed in claim 3, wherein said transfer device comprises at least one jack fixed to said support and having a piston which is connected to a thrust bar which is parallel to said first bar and capable of being introduced in a slot defined by the outlet of said feed device and the upper face of one of the sides of said first bar.

5. A supply device as claimed in claim 1, wherein said thrust device comprises a nozzle fed with air under pressure at predetermined instants and disposed in alignment with said groove.

6. A supply device as claimed in claim 3, wherein said detecting device comprises a pneumatic detector having an inlet located on the downstream side of said detecting device level with said groove, an air supply conduit located in front of said inlet whereby the air issuing from said conduit and entering said inlet is interrupted by the rod which passes in front of said inlet in issuing from said presenting device.

7. A supply device as claimed in claim 6, comprising a source of air under pressure connected to said pneumatic detector.

8. A supply device as claimed in claim 6, further comprising a first pneumatic time-delay device, a second pneumatic time-delay device, and a third time-delay device, said pneumatic detector being connected to said synchronizing device so as to excite said first pneumatic time-delay device and said second time-delay device, one of said time-delay devices controlling said spraying device and the other said thrust device through a valve the excitation of which brings into operation said third time-delay device which puts said valve back to zero after a predetermined period of time.

9. A supply device as claimed in claim 8, wherein said second time-delay device is excited with a predetermined delay relative to said first time-delay device.

References Cited

UNITED STATES PATENTS 1,475,189  11/1923  Krebs _____ 228—41
1,966,200   7/1934  Eskilson _____ 228—41

RICHARD H. EANES, JR., Primary Examiner